United States Patent Office 3,616,696
Patented Nov. 2, 1971

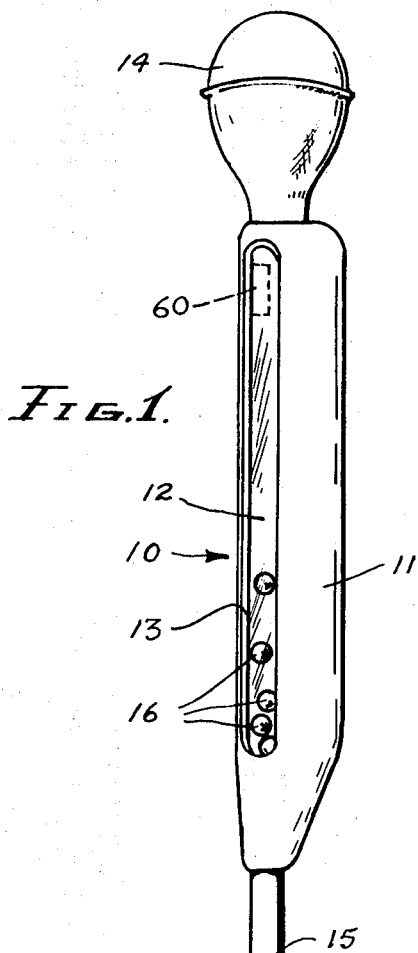
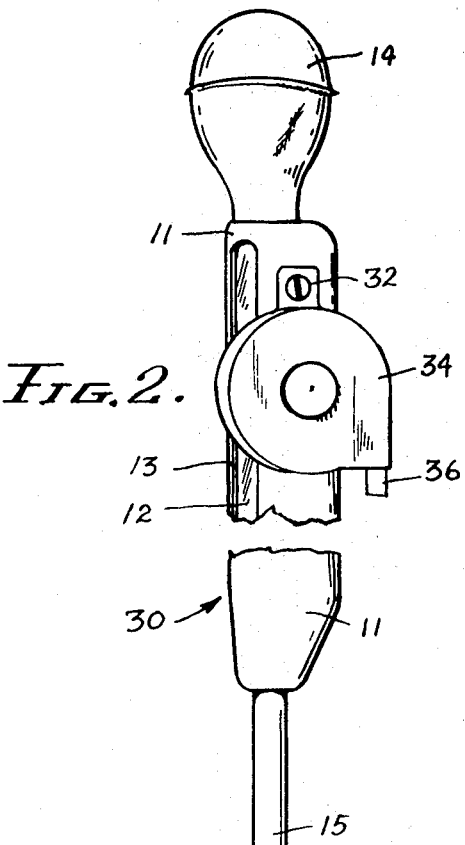
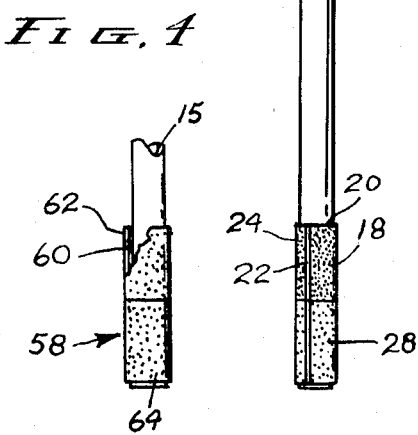
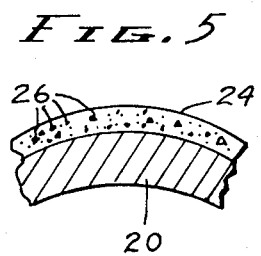
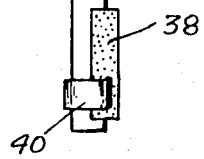

3,616,696
APPARATUS FOR DETERMINING THE SUITABILITY OF SOLUTIONS SUCH AS RADIATOR COOLANT
Thomas B. Ludlow, Arden Hills, and John D. Skildum, St. Paul, Minn., assignors to Johanna Plastics, Roseville, Minn.
Filed Aug. 4, 1969, Ser. No. 847,076
Int. Cl. G01n 9/10, 31/22
U.S. Cl. 73—441                                                                7 Claims

ABSTRACT OF THE DISCLOSURE

Because the corrosiveness and freezing point of radiator coolant are related, the suitability of the coolant depends on both factors. To determine the condition of the coolants in accordance with the invention the pH and specific gravity are measured simultaneously. This is accomplished by placing a pH measuring color indicator on the nozzle or other portion of a hydrometer that is adapted to enter the solution when the hydrometer is filled. In a preferred form of the invention indicator consists of a matrix composed of a continuous phase of a moisture permeable material in which is dispersed a water insoluble pH sensitive indicator.

---

The present invention relates to a process and apparatus for testing solutions of various kinds such as the radiator coolant used in engines and particularly automobile engines. While the invention is adaptable for use in testing the suitability of a variety of fluids it will be described in detail in connection with the evaluation of radiator coolant.

The coolant used in the radiators of engines such as automobile engines consists of water, a freezing point depressant such as ethylene glycol and a corrosion inhibitor. The corrosion inhibitor can be of two types; oil or antioxidant. For the rust inhibitor to operate satisfactorily it must be buffered on the basic side with a suitable substance such as sodium tetra borate (borax). The term "coolant" has used herein will refer to a mixture of water, ethylene glycol or other freezing point depressant and a commercially available corrosion inhibitor.

As the engine is run over a period of months, the coolant gradually becomes degraded as shown by the formation of acids such as formic acid. If the coolant is allowed to contact air, the degradation process is accelerated and as the acid content of the coolant increases, corrosion of the cooling system will occur at a faster rate. In addition to these changes, the freezing point may change due to a loss of ethylene glycol.

Because commercially available anti-freeze preparations of the kind used in automobiles contain corrosion inhibitors and a buffer, the pH of a fresh solution antifreeze when mixed with water will vary depending upon the amount of anti-freeze used. Thus, for example, when the amount of anti-freeze is about 33% (the lower end of the scale insofar as freezing point depression is concerned) the pH might vary from about 8.5 to about 8.8. With the same anti-freeze at a concentration of about 60% the pH would be less e.g. about 8.0 to about 8.6. Of the commercially available anti-freeze solutions measured by us, the lowest in pH at 33% volume concentration had a pH at about 7.8. At a concentration of 60% by volume the pH was about 7.5.

With this in mind it will be seen that the condition of the coolant is dependent upon three factors, the concentration of anti-freeze preparation in the coolant, the composition of the anti-freeze and the amount of degradation that has occurred. Even more interesting is the fact that the means for correcting a deficiency in the coolant cannot be determined by measuring either the pH or specific gravity alone.

The pH indicator papers now available are not suited for repeated use and are poorly suited for use in testing hot solutions which leach out the indicator chemical. Moreover, they are sensitive to humidity and often are harmed by exposure to light.

In view of these and other defects of the prior art it is one object of the present invention to provide an improved apparatus and method for determining the characteristics of solutions and particularly of a coolant used in the radiator of an engine.

A further object of the invention is the provision of an improved instrument for indicating whether water, antifreeze, corrosion inhibitor or both of the latter should be added to a cooling solution to retain the solution to proper operating condition.

A further object of the invention is the provision of an improved instrument for simultaneously measuring specific gravity and pH which can be employed effectively by service station attendants with a minimum of instruction.

A further object of the invention is the provision of an improved instrument for accurately determining the state of deterioration of a coolant at any temperature.

A further object of the invention is the provision of improved instrument of the type described which is simple in construction, rugged in operation, inexpensive to produce and is fool proof in the hands of a semiskilled operator.

A further object of the invention is the provision of an improved instrument of the type described including a pH indicator that changes color at a selected pH and will operate repeatedly in a large number of tests run one after the other.

A further object of the invention is the provision of an improved apparatus and method for testing cooling solutions in which the operator can by introducing a single instrument into the coolant determine whether the solution is suitable for use.

These and other more detailed and specific objects of the invention will be apparent through the following specification and drawings wherein:

FIG. 1 is a perspective view of a hydrometer embodying one form of the present invention.

FIG. 2 is a perspective view of a hydrometer embodying another form of the invention.

FIG. 4 is another form of pH indicator.

FIG. 5 is a greatly enlarged fragmentary view of the pH indicator of FIG. 1.

Figure 3:
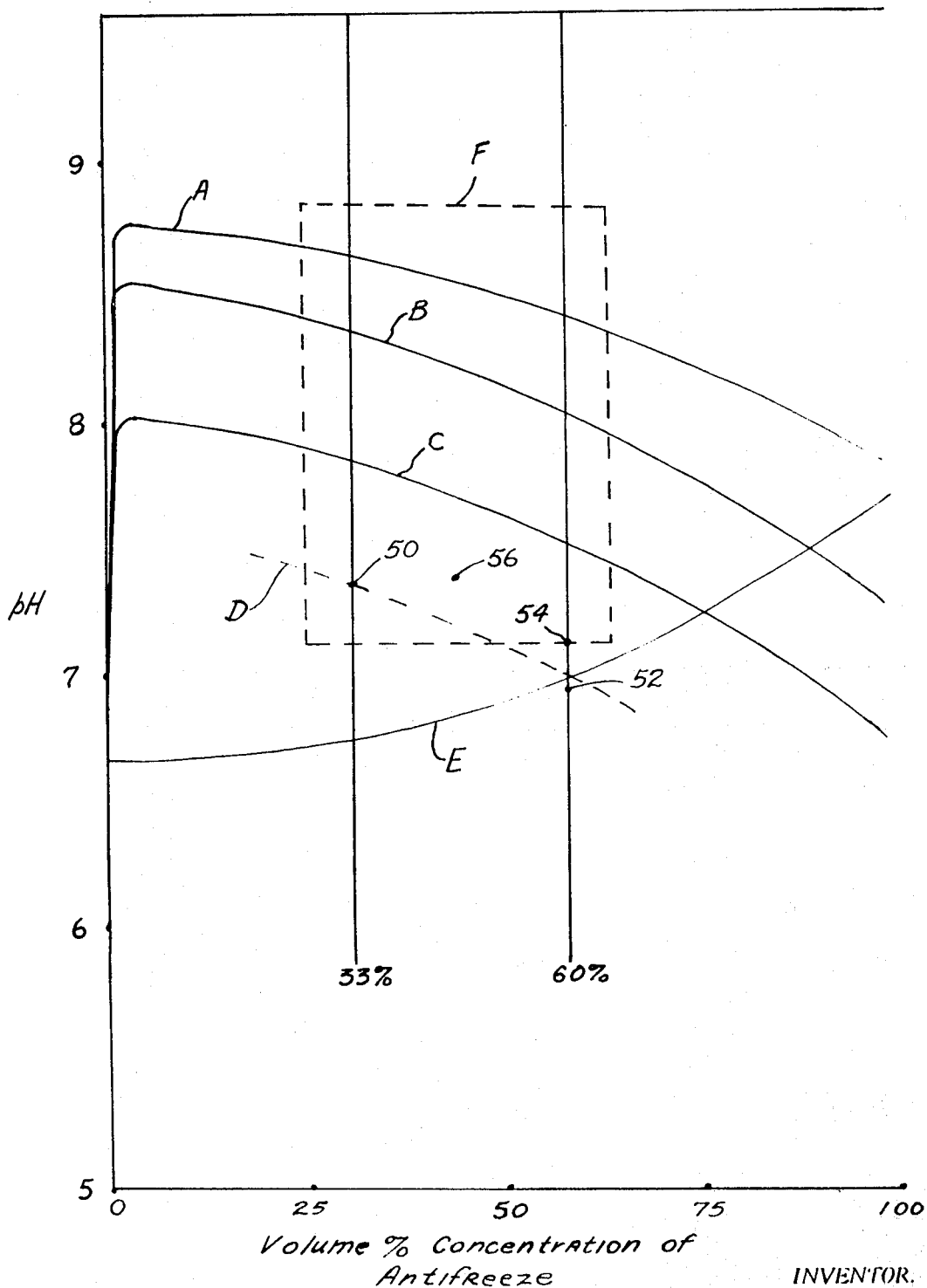
FIG. 3 is a graph illustrating the relationship between the pH of a radiator coolant and the anti-freeze concentration.

In accordance with the present invention a solution is simultaneously subjected to specific gravity and pH tests. Thus, if only the freezing point depression is off it is necessary to add only anti-freeze. If the acidity is too high, then either corrosion inhibitor or water can be added but the latter will influence the freezing point. If both freezing point and pH are off, then both rust inhibitor and anti-freeze can be added or the entire solution replaced. In a preferred form of the invention, a pH indicator of a suitable kind is placed on the tip or other portion of a hydrometer adapted to contact the coolant solution when the coolant solution is drawn into the hydrometer. Accordingly, both the pH and the specific gravity are measured by means of a single physical operation performed by the service station attendant and the two measurements cooperate together allowing the operator to determine the condition of the coolant.

One especially useful form of pH indicator is a repeating color change pH indicator. Such an indicator enables the operator to use the hydrometer again and again and obtain a pH indication in each cooling system as the specific gravity is measured.

A preferred repeatable indicator comprises a continuous matrix formed from a moisture permeable but water insoluble material in which is dispersed a water insoluble colored chemical pH indicator.

While various indicators can be used in accordance with the invention it is preferred that a mixture of two indicator dyes is employed since mixtures of this kind are characterized by a sudden color change at a particular pH value. A combination of indicators of this kind can be referred to as a short range indicator.

Refer now to FIG. 1 which illustrates a preferred form hydrometer that can be used in accordance with the invention. A specific gravity tester or hydrometer 10 comprises an elongated housing or case 11 constructed of metal or plastic and enclosing elongated glass vessel on tube 12 a portion of which can be seen through a window 15.

Secured to the upper end of the tube 12 is a resilient bulb 14 which can be composed of rubber or the like. When collapsed and expanded, the bulb 14 serves to draw liquid being tested into the interior of the vessel 12.

Since the hydrometer 10 is especially adapted in this case for use in testing anti-freeze solutions, one end of an elongated flexible duct 15 is secured to the lower end portion of the tube 12 and communicates with the interior of the tube. With this arrangement, the flexible duct 15 may be inserted into the radiator of an automobile or other vehicle to facilitate removal of the coolant. The strength of the coolant, i.e. its freeze point, is measured by the provision of a plurality of indicator balls 16 which are of substantially identical size and shape, preferably spherical, but each has a different specific gravity. In the embodiment shown, five such indicator balls are included each with its specific gravity corresponding to a specific strength of coolant. Each indicator ball 16 is a different color so that it can be easily distinguished from the others. Directions provided with the hydrometer designate freezing temperatures that correspond with the number of balls which the operator notes are floating in the solution. A further description of the hydrometer is given in U.S. Pat. 3,451,273.

While one form of specific gravity tester has been illustrated by way of example it is to be understood that a variety of other forms of specific gravity testing devices can be used such as those including a floating cell with vertical markings that indicate the level to which the cell rises in the liquid.

At the lower end of the duct 15 is a pH indicator designated by the numeral 18. The indicator 18 consists of a metal sleeve 20 in the general form of a tube and having a longitudinally extending gap 22 to facilitate its being forced over the lower end of the duct 15 and held in place by friction. On the surface of the sleeve 20 is a coating which will be described in more detail below. It contains a pH sensitive indicator substance 26 of the kind adapted to change color at a selected pH or pH range. In this instance, the sleeve 20 is provided with two pH indicator bands; the first on the upper portion of the sleeve is designated 24 and the second on the lower portion of the sleeve is designated 28. Each band is adapted to undergo a color change at a different pH. For example, the indicator 26 of the upper band 24 can be designed to undergo a color change of pH of about 7.2 and the lower band 28 at a pH of about 5.9. The sleeve 20 is suitably treated to render it receptive to coatings e.g. by means of a standard etching solution.

In a typical application of the invention, the upper band comprises a mixture of one part phenol red and one part bromothymol blue. This mixture will undergo a rather rapid color change from purple to yellow proceeding toward the acid side. The carrier or matrix of the lower band in this instance contains a mixture of two different pH sensitive indicators such as one part of brom cresol purple and one part of bromothymol blue.

When the above combination of chemical pH indicators is employed, the operator would be instructed to add a corrosion inhibitor if the indicator showed that the pH was below 7.5 and to change the coolant completely if the pH was indicated as below 6.7. If the specific gravity shows that the volume concentration of ethylene glycol was less than 33 percent, more ethylene glycol should be added. If, however, more than 60 percent was present and the pH was less than 7.5, the problem might be corrected by merely adding water to the coolant.

When the apparatus of FIG. 1 is to be used, the bulb 14 is compressed and the lower end of the tube 15 is inserted in the coolant. The bulb is then released in the normal way allowing the fluid to enter the glass tube 12 thereby floating the indicator balls 16. Simultaneously, the pH indicator bands 24 and 28 are submerged in the coolant. Since the matrix is permeable to moisture, the fluid will contact the particles of indicator material 26. The pH will then be indicated by the color assumed by the bands 24 and 28.

It will be understood that while only two bands of indicator material 24 and 28 have been shown in the embodiment of FIG. 1, any number of bands can be employed; each adapted to change color at a different pH value.

The particular indicator or a combination thereof forms no part of the present invention. It is important, however, to note that a combination of two different chemical indicator dyes is preferred since small pH changes can be made to produce abrupt color changes. This makes the coating more sensitive and more clearly indicates relatively small pH changes.

We have discovered that the matrix must exhibit certain characteristics to be suitable in a repeating indicator. First, it must be moisture permeable but insoluble in moisture. Second, it must itself have a pH which is close to the color change pH interval of the indicator. And third it should have sufficient physical strength to support the indicator during repeated uses. It appears that some of the indicator is dissolved in the matrix and some remains dispersed therein.

The chemical composition of the matrix 24 can be varied substantially. It can be composed of a paint or a solid substance such as a plastic extrusion.

The degree of moisture permeability of the matrix is not critical; suffice it to say that the more rapidly the matrix is permeated with the solution being measured, the more quickly will the measurement be indicated by the chemical indicator. By "moisture permeable" is meant capable of being permeated sufficiently to that an indicator dispersed therein will show a color change after immersion for 2 minutes at 70° F. A film former composed of a polar material is preferred to a nonpolar material. For example, polyolefins cannot be used because of their hydrophobic characteristics and their high surface tension. Obviously, the matrix must have sufficient film strength to remain in place and cannot be soluble in water. If the inherent pH of the film former used in the matrix is not correct, it can be adjusted by adding a small amount of acid or base. While a variety of materials can be used as the film former for the matrix, one suitable film former is an acrylic melamine composition. To this film former can be added suitable solvents, pigments which serve primarily as opacifiers, thickening agents and the like, well known to those skilled in the paint and ink industry.

The instrument 30 of FIG. 2 is in all respects similar to the instrument of FIG. 1 except that the instrument body 11 has secured to it in any suitable manner, e.g. screw 32, a reel 34 of containing a commercially available pH indicator paper 36 in ribbon form. A small piece 38 is removed when the instrument is used and is placed in a clip 40 formed from spring steel and permanently secured to the lower end of the tube 15 to retain the indicator paper 38 in place on the tube. When the instrument 30 is to be used, the lower end of tube 15 is inserted into the coolant, the bulb 14 is squeezed and released allowing the coolant to enter the lower end of the duct 15 and flow upwardly into the glass tube 12 thereby floating the indicator balls 16.

The indicator paper 38 is discarded after each test and a new piece is withdrawn from the reel 34, torn off and placed in the clip 40. Thus, each time the instrument is to be used, a fresh piece of pH indicator paper is placed in the clip 40. While a variety of pH indicator tapes can be employed, one suitable tape is a short range Hydrion test paper manufactured by Micro Essential Laboratories, Inc., Brooklyn, N.Y. Tapes of the kind shown in FIG. 2 are not preferred to the device of FIG. 1 because the indicator chemical leaches easily and because it is necessary to use a new piece of indicator paper with each test. In addition, exposure to humid air causes undesirable color changes to take place. Exposure to light causes further degradation of the test paper before it is used. Moreover, test papers are not repeatable in use and if the coolant is hot, e.g. 150° F., the dye in the pH indicator paper will leach out. Accordingly, the papers are unuseable at temperatures in which they are most commonly needed for engine coolant testing.

Reference will now be made to FIG. 3 which shows the effect of anti-freeze concentration on pH for three commercially available anti-freeze solutions. Curve A shows that even a small amount of the anti-freeze will bring the pH up to about 8.7. Then, as the concentration of anti-freeze is increased, the pH will drop from about 8.65 at 33 percent to about 8.5 at 60 percent and finally to about 7.9 at 100 percent. In curve B, representing another commercially available brand of anti-freeze, the pH is initially about 8.5. This drops to about 7.4 in a solution of about 100 percent anti-freeze. In the brand C anti-freeze, the pH is initially 8 and drops to about 6.8 at 100 percent concentration.

After a period of time the coolant becomes degraded as described above with a build-up of acids such as formic acid among others. Degradation shifts the entire curve downwardly as shown by the curve D. From these curves it can be seen that pH of the solution depends both upon the concentration of anti-freeze and upon the degree of degradation that has taken place. As a result of this fact, the condition or suitability of the coolant as a whole cannot be known from either the pH alone nor the specific gravity alone. Both cooperate in enabling one to determine whether or not it is suitable for use. Assuming, for example, that the volume percent concentration of anti-freeze is 33 percent and the pH is 7.4 (point 50 on the table) it can be seen by adding anti-freeze alone to increase the percent concentration to 60 percent, the pH would fall to about 6.9 (point 52). An additional amount of corrosion inhibitor should be added together with the anti-freeze being added. Similarly, if the concentration of anti-freeze is 60 percent and the pH is 7.2 (point 54 on the example) the addition of water alone in the proper amount to bring the concentration of anti-freeze to 40 percent will bring the pH up to about 7.4 (point 56) which is entirely satisfactory. (Curve E represents the effect of raw ethylene glycol.) Generally speaking, the pH and volume percent concentration of anti-freeze should be within the domain on the graph designated by the box F.

Refer now to FIG. 4 which illustrates another embodiment of the invention. Secured in this case to the lower portion of the tube 15 of a hydrometer which is in all respects similar to that of FIG. 1 is a sleeve 58 composed of a metal tube 60 with a colored reference band 62 on its upper portion and a colored band below formed from a pH sensitive chemical indicator dye 64 dispersed in a matrix of the kind described above. The indicator band 64 can be in all respects similar to the bands 24 or 28 of FIG. 1. The reference band 62 can consist of any wear resistant paint having approximately the same color that the indicator band 64 has when the pH is above 7.2. For purposes of example, it will be assumed that the color of the indicator band 64 changes at a pH of approximately 7.2. Thus, during operation, when the lower end of the tube 15 of the hydrometer is inserted into the coolant and the pH is below 7.2, the color of the band 64 will change to a color that contrasts sharply with the color of the reference band 62.

The device can be modified in many ways. For example, the pH indicator can be mounted within the vessel 12 rather than on the tube 15 as shown at 60 in FIG. 1.

The invention will be better understood by reference to the following examples.

EXAMPLE I

A hydrometer of the kind shown in FIG. 1 and described above has secured to the lower end of the tube 15 a metal sleeve to which is applied a film of material with the following composition:

| | Gr. |
|---|---|
| Acrylic ester containing free acrylic acid with a melamine curvative in a solvent composed of small amount of water, butyl alcohol and $NH_4OH$ (e.g. Acrysol 2003 [1]) | 1500 |
| Refined clay for controlling viscosity (e.g. Attagel 50 [2]) | 100 |
| Material to make the solution thixotropic for dip coating (e.g. Kelzan [3]) | 10 |
| Pigment opacifier for internal color in the film (e.g. $TiO_2$) | 300 |
| Fine grade asbestos particles (98.5%—325 mesh screen) for imparting greater water permeability to film (Asbestin 3X [4]) | 100 |
| Water | 500 |

[1] Rohm & Haas Company, Philadelphia, Pa.
[2] Minerals and Chemicals Philipp Company, Menlo Park, N.J.
[3] Kelco Company, San Diego, Calif.
[4] International Talc Company, New York, N.Y.

This composition is ball milled for from 12 to 24 hours to obtain a good dispersion.

A first film composition which is yellow above pH of 7.2 and red-purple below 7.2 is made by adding the following composition to the above base:

| | Grams |
|---|---|
| 4 phenylazo-1 naphthylamine | 1.5 |
| Neutral red | 5.0 |
| Methyl red | 15.0 |

This combination of chemical indicators is dissolved in a solution composed of 45 cc. of ethyl alcohol, 45 cc. of water and 10 cc. of ethylene glycol monomethyl ether after which the pH of the dispersion is adjusted to 8.5. The solution is then added to the mill base and ball milled for an additional two hours after which the etched sleeves are ready to dip.

EXAMPLE II

A second film composition which is yellow above a pH of 5.9 and purple below a pH 5.9 is prepared in the following manner:

To the mill base of Example I is added a solution composed of the following materials:

4-(4 - dimethylamino - 1 - naphthyloazo)-3-methoxybenzenesulfonic acid—15 grams
4-phenylazo-1 naphthylamine—1.5 grams
Ethanol—45 cc.
Water—40 cc.
Ethylene glycol monomethyl ether—20 cc.

This solution is added to the mill base and ball milled for two hours. The sleeves are then ready to dip in solution.

Following the dipping operation, the film is allowed to air dry for an hour. Film 1 is baked about 250° for 12 minutes. This causes the acrylic resin to cross link with the melamine resin. It is preferable to bake the film type 2 for about 15 minutes.

The performance of these films is as follows: Each exhibits a color change reaction time of less than 15 seconds at 60° F. and can be recycled repeatedly for over a hundred cycles under most conditions and ordinarily over 1000 cycles. At 150° F. the color change reaction time is less than 3 seconds and a sleeve can be recycled by dipping from acid to base and back to acid through over a hundred cycles and ordinarily over 1000 cycles without loss of its pH indicating properties.

We claim:

1. An apparatus for evaluating the suitability of a solution comprising a hydrometer and an attached pH indicator placed on the hydrometer in a position adapted to contact the solution when the hydrometer is introduced into the solution to thereby simultaneously provide an indication of the specific gravity and a pH of the solution, said hydrometer including a vessel adapted to be filled with the solution when the hydrometer is used, a means for drawing the solution into the vessel, said hydrometer including an opening for introducing and expelling the solution from the vessel, a pH indicator mounted upon the hydrometer in a position to contact the solution when the hydrometer is used, said indicator comprising a matrix formed from a water insoluble but water permeable material having dispersed therein a water insoluble pH indicator substance adapted to undergo a color change at a selected pH whereby the pH indicator is capable of repeated pH measurement many times in succession at temperatures up to at least 180° F. whereby the specific gravity and pH readings together can be compared with the effect of adding antifreeze, anticorrosion inhibitor or both of them to determine what is to be added to the solution to preserve both the pH and the freezing point of the coolant solution.

2. The combination of claim 1 wherein the matrix contains a film former comprising an acrylic melamine composition.

3. The instrument of claim 1 including an intimate mixture of at least two indicator substances in the matrix.

4. The instrument of claim 1 wherein a plurality of matrices are mounted on the hydrometer; each having a pH indicator therein adapted to undergo a color change at a different pH.

5. The apparatus of claim 1 wherein a color reference is mounted upon the hydrometer adjacent the matrix.

6. The apparatus of claim 1 wherein a color reference is mounted on the hydrometer to provide for visual comparison with the pH indicator substance.

7. The apparatus of claim 1 wherein the indicator substance is mounted within the vessel.

References Cited

UNITED STATES PATENTS

| 1,767,439 | 6/1930 | Edelmann | 73—441 |
| 2,049,110 | 7/1936 | Dru | 23—253 |
| 2,567,445 | 9/1951 | Parker | 23—253 X |
| 2,643,230 | 6/1953 | Mooradian | 23—253 X |
| 3,127,281 | 3/1964 | Meyer | 23—253 X |
| 1,216,303 | 2/1917 | Freeman | 23—253 TP |
| 2,167,304 | 7/1939 | Kloz | 23—253 TP |
| 2,721,183 | 10/1955 | White et al. | 252—74 |
| 3,006,735 | 10/1961 | Jordan | 23—253 TP X |

OTHER REFERENCES

"The Physical Properties and Behavior of Ethylene and Propylene Glycol and Their Water Mixtures," L. D. Polderman. Presented in ASHRAE, Jan. 26–29, 1959 (in 252/75 Lit).

RICHARD C. QUEISSER, Primary Examiner

C. E. SNEE III, Assistant Examiner

U.S. Cl. X.R.

23—253 TP; 252—74